United States Patent [19]
Norton

[11] Patent Number: 5,890,315
[45] Date of Patent: Apr. 6, 1999

[54] FISHING LURE WITH FIREARM SHELL CASING

[75] Inventor: Don S. Norton, Clinton, Miss.

[73] Assignee: United Plastic Molders, Inc., Jackson, Miss.

[21] Appl. No.: 944,338

[22] Filed: Oct. 6, 1997

[51] Int. Cl.$^6$ ................................................ A01K 85/01
[52] U.S. Cl. ........................................ 43/42.31; 43/42.35
[58] Field of Search ......................... 43/42, 42.31, 42.35; D22/126, 132, 133

[56] References Cited

U.S. PATENT DOCUMENTS

| | | | |
|---|---|---|---|
| D. 362,486 | 9/1995 | Short et al. | D22/126 |
| D. 364,443 | 11/1995 | Rasmusson | D22/126 |
| D. 388,495 | 12/1997 | Gentry | D22/126 |
| D. 397,758 | 9/1998 | Magers | D22/126 |
| 1,878,015 | 9/1932 | Steffensen | 43/42.35 |
| 2,736,981 | 3/1956 | Bonanno | 43/42.35 |
| 2,763,954 | 9/1956 | Bunker | 43/42.31 |
| 2,786,295 | 3/1957 | Corning, II | D22/132 |
| 2,833,216 | 5/1958 | Rommel | D22/126 |
| 2,952,091 | 9/1960 | Blanchard | 43/42.35 |
| 2,968,886 | 1/1961 | Cotroumpas | D22/126 |
| 2,983,065 | 5/1961 | Ferguson et al. | 43/42.35 |
| 2,994,982 | 8/1961 | Murawski | 43/42.35 |
| 3,158,953 | 12/1964 | Filler | 43/42.35 |
| 3,643,368 | 2/1972 | Pool | 43/41.2 |
| 3,705,465 | 12/1972 | Charney | 43/42.31 |
| 3,935,660 | 2/1976 | Plew | 43/42.31 |
| 4,622,773 | 11/1986 | Calagui | 43/43.16 |
| 4,631,852 | 12/1986 | Whritenour | 43/19 |
| 4,969,287 | 11/1990 | Johnson | 43/42.31 |
| 5,001,856 | 3/1991 | Gentry | 43/42.31 |
| 5,024,019 | 6/1991 | Rust et al. | 43/42.31 |
| 5,038,513 | 8/1991 | Hardin | 43/42.31 |
| 5,121,568 | 6/1992 | Lindmeyer | 43/42.31 |
| 5,144,765 | 9/1992 | Keeton | 43/42.31 |
| 5,230,178 | 7/1993 | Dillard | 43/42.31 |
| 5,259,151 | 11/1993 | Wicht | 43/42.31 |
| 5,784,828 | 7/1998 | Thompson | 43/44.9 |

FOREIGN PATENT DOCUMENTS 2087201  5/1982  United Kingdom ................. 43/42

Primary Examiner—Michael J. Carone
Assistant Examiner—Darren Ark
Attorney, Agent, or Firm—Nixon & Vanderhye P.C.

[57] ABSTRACT

Fishing lures which include an empty firearm ammunition shell casing and a fishhook attached thereto. Soundwave-propagation is achieved by means of one or more rattle bead or beads freely housed within the interior cylindrical space of the shell casing to thereby attract game fish when the lure is submerged during use. Most preferably, the fishhook is attached rigidly to the rearward rim surface of the shell casing (e.g., in the pocket space in which the primer for the cartridge is seated) and protrudes rearwardly therefrom. A spoon or other decorative lure devices may optionally be attached to the shell casing to provide the fisherman with the desired effect.

24 Claims, 3 Drawing Sheets

FISHING LURE WITH FIREARM SHELL CASING

FIELD OF THE INVENTION

The present invention relates generally to fishhooks and lures. More particularly, the present invention relates to fishhooks and lures which include soundwave-producing structures which serve as a fish attractant when submerged during use.

BACKGROUND AND SUMMARY OF THE INVENTION

It is known that a variety of fish are attracted by soundwaves propagating from submerged simulated bait and lures. According to the present invention, therefore, such soundwave-propagation is achieved by means of one or more rattle bead or beads freely housed within the interior cylindrical space of an empty ammunition cartridge or shell casing for firearms. Most preferably, the fishhook is attached rigidly to the rearward rim surface of the shell casing (e.g., in the pocket space in which the primer for the cartridge is seated) and protrudes rearwardly therefrom. A spoon or other decorative lure devices may optionally be attached to the shell casing to provide the fisherman with the desired effect.

BRIEF DESCRIPTION OF THE ACCOMPANYING DRAWINGS

Reference will hereafter be made to the accompanying drawings wherein like reference numerals throughout the various FIGURES denote like structural elements, and wherein, FIG. 1 is a perspective view from the bottom of one exemplary fishing lure in accordance with the present invention;

FIG. 2 is an exploded perspective view of the fishing lure depicted in FIG. 1; and FIG. 3 is a perspective view from the bottom of another exemplary fishing lure in accordance with the present invention.

DETAILED DESCRIPTION OF THE INVENTION

Figure 1:
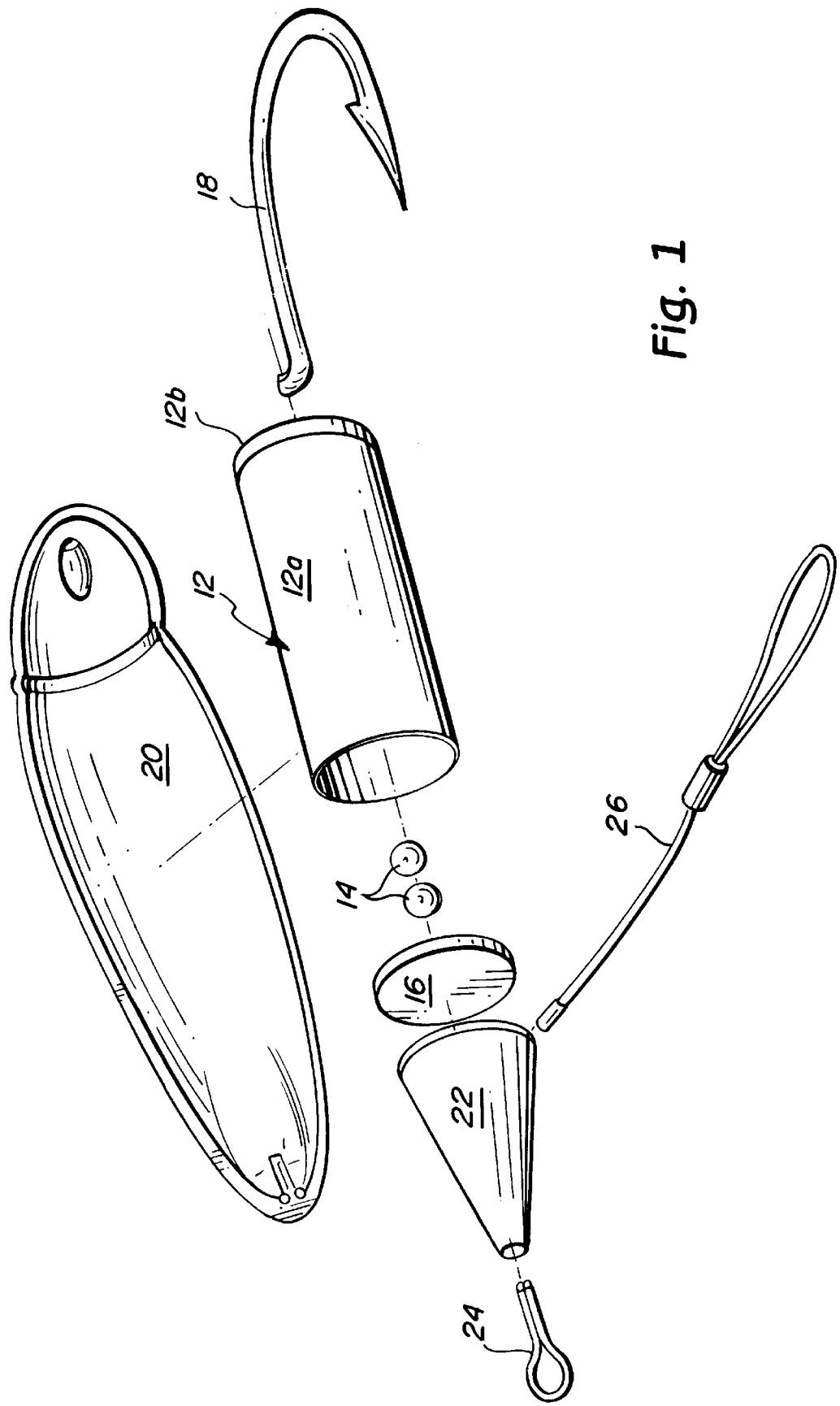
Figure 2:
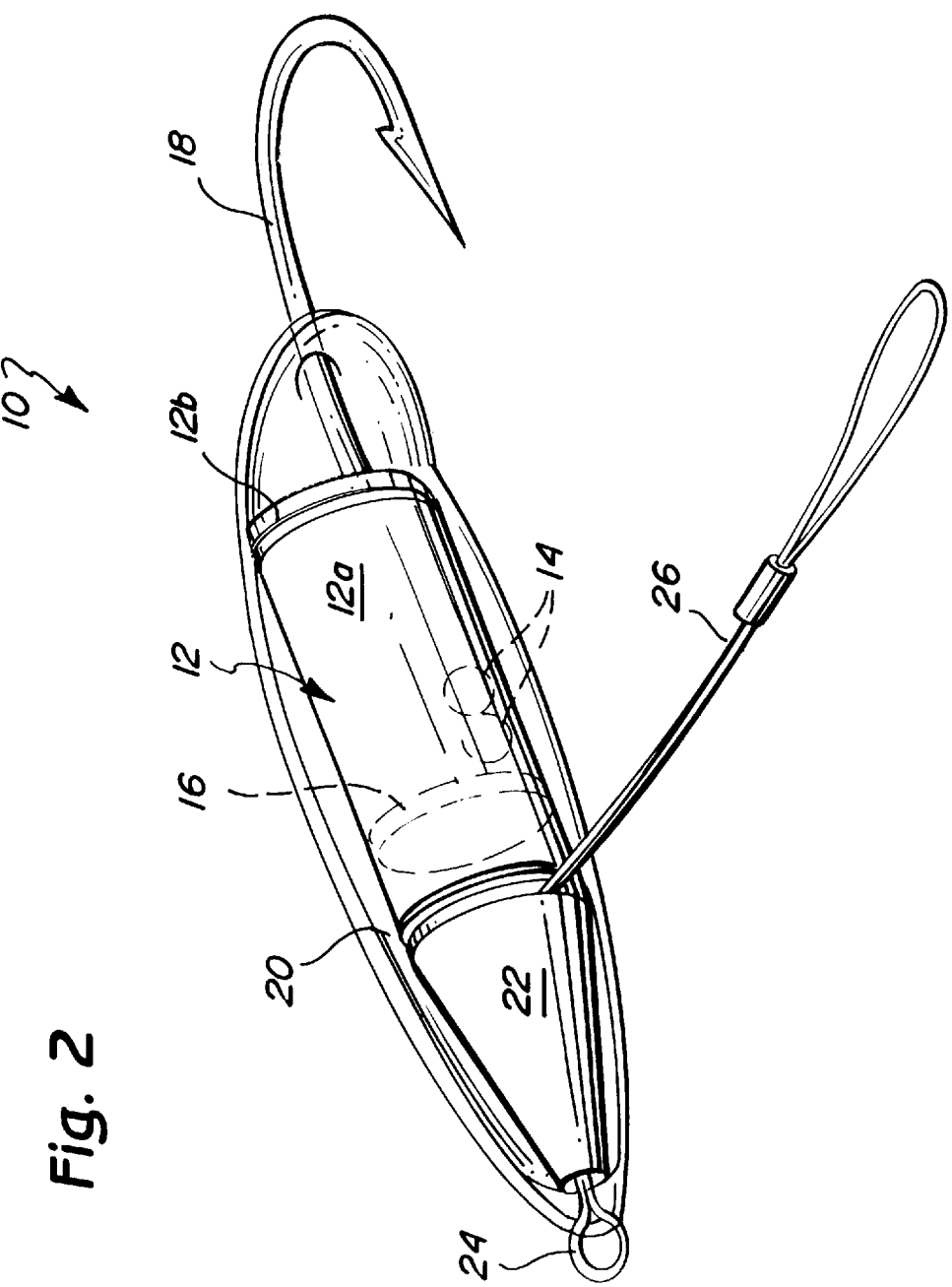

Accompanying FIGS. 1 and 2 depict an exemplary fishing lure in accordance with the present invention. In this regard, the lure 10 is necessarily comprised of an empty ammunition cartridge or shell casing 12 for a firearm, such as a rifle or handgun. The shell casing may be pristine (i.e., never fired) or may be a spent casing which remains after having been fired from a firearm.

Typically, such shell casings are constructed of brass, but simulated shell casings made from rigid plastics material may also be used. Thus, as used herein and in the accompanying claims, the term "shell casing" and like terms such as "ammunition cartridge" are meant to refer to a generally cylindrical body 12a having an enlarged diameter rim 12b which substantially closes one end opposite to an open end thereof (except for the primer pocket) and which is adapted to be used as, or which simulates, firearms ammunition. The shell casing may thus be made of virtually any rigid metal or plastics material, although conventional brass shell casings are particularly preferred.

The cylindrical body 12a houses one or more rattle beads 14. The rattle beads 14 are freely movable within the interior cylindrical space of the body 12a so as to create soundwaves when they impinge against the rigid wall of the body 12a. Such soundwaves will thus be audible when the lure is shaken in a gaseous fluid (e.g., air) and will propagate outwardly from the body 12a. When submerged in water, therefore, movement of the lure 10 will responsively cause soundwaves to propagate and thereby attract fish through a vibratory sensation. The rattle beads 14 are maintained within the interior space of the body 12a by a plug disc 16.

Figure 3:
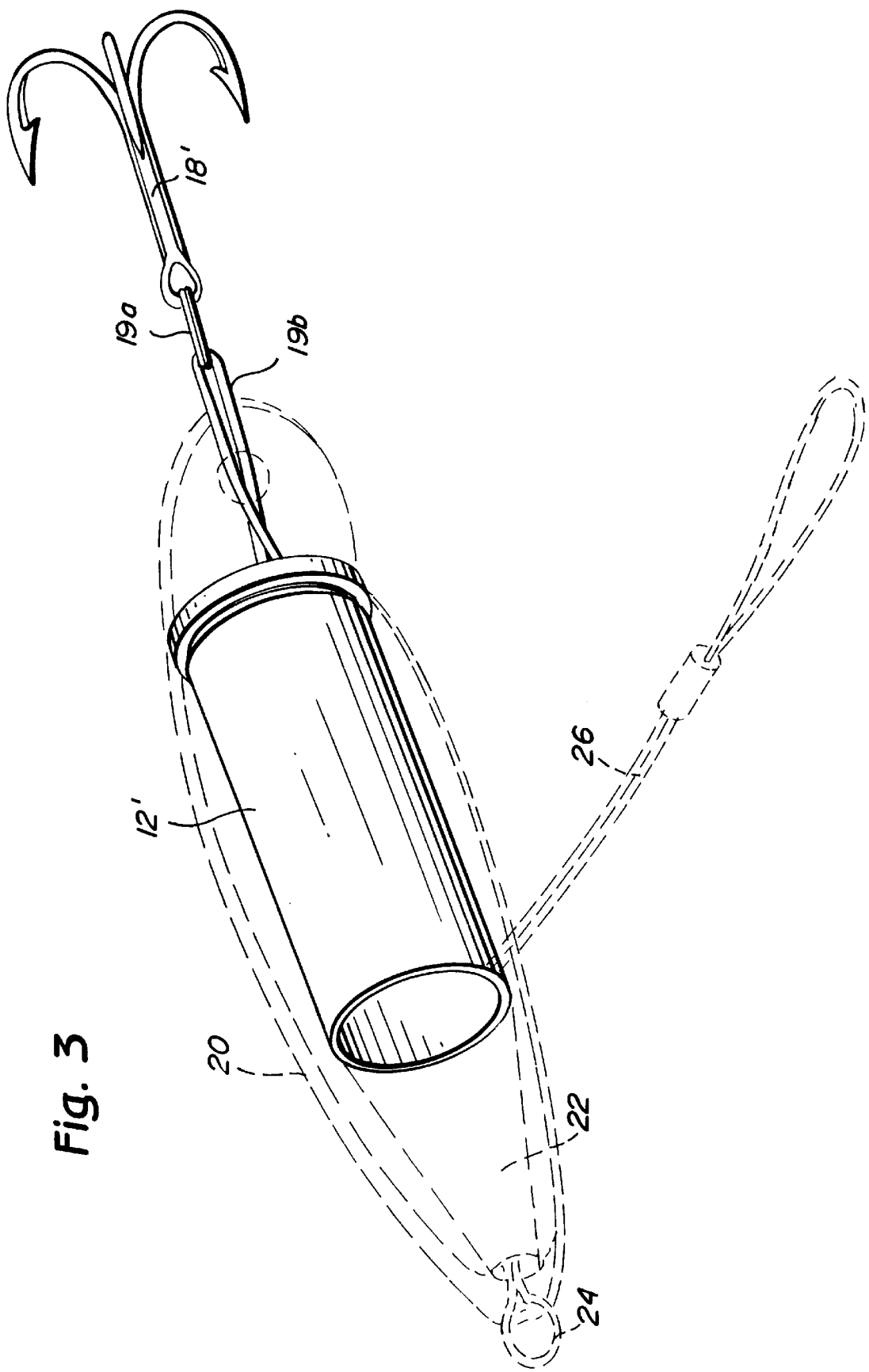

A standard barbed fishhook 18 is physically attached to the rim 12b of the shell casing 12. By way of example, as shown in the accompanying FIGURES, the shank portion of the fishhook 18 may be rigidly connected (e.g., by solder, adhesive or the like) to the shell casing 12 by being partially inserted into the primer pocket (not shown) of the rim 12b. Alternatively, a single or multi-barbed fishhook 18' may be attached to the rim 12b and/or cylindrical body 12a by means of a conventional swivel structure 19a and associated leader 19b attached to the shell casing 12' as shown, for example in accompanying FIG. 3.

The lure 10 may be provided with a number of optional structures to suit specific fishing situations and/or game fish. For example, as depicted in the accompanying drawing FIGURES, the lure 10 may be provided with a metallic or plastic spoon body 20 which is rigidly attached to the shell casing 12 by any convenient means. The open end of the cylindrical body 12a may be closed by a conically shaped head structure 22 which carries at its apex end a conventional eyelet 24 for attaching the lure 10 to fishing line. Furthermore, the lure 10 may be fitted with a weed guard 26, most preferably of the type disclosed in copending and commonly owned U.S. patent application Ser. No. 08/899,604 filed on Jul. 24, 1997 (the entire content of which is expressly incorporated hereinto by reference). Suffice it to say here that virtually any desired accessory and/or accent may be provided with the lures of the present invention.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fishing lure comprising:

an empty firearm shell casing; and a fishhook attached to said shell casing.

2. The fishing lure as in claim 1, wherein said shell casing is made of a rigid metal or plastics material.

3. The fishing lure as in claim 2, wherein said shell casing is made of brass.

4. The fishing lure as in claim 1, further including at least one rattle bead freely housed within said shell casing.

5. The fishing lure as in claim 4, further comprising an end plug to retain said at least one rattle bead within said shell casing.

6. The fishing lure as in claim 4, which includes a plurality of said rattle beads.

7. The fishing lure as in claim 4, wherein said at least one rattle bead is formed of a metal or plastics material.

8. The fishing lure as in claim 1, wherein said fishhook includes a shank portion which is connected rigidly to said shell casing.

9. The fishing lure as in claim 8, wherein said shell casing includes a primer pocket, and wherein said fishhook shank portion is partially inserted into said primer pocket.

10. The fishing lure as in claim 1, which further comprises a spoon body attached to said shell casing.

11. The fishing lure as in claim 1, which further comprises a generally conically shaped cap extending forwardly of said shell casing.

12. The fishing lure as in claim 11, wherein said generally conically shaped cap includes an eyelet at an apex end thereof for connection to a fishing line.

13. The fishing lure as in claim 1, which further comprises an eyelet for connection to a fishing line.

14. A fishing lure comprising:

a firearm shell casing;

a fishhook attached to said shell casing; and one or more rattle beads housed by said shell casing for free movements therewithin, wherein said rattle beads cause sound waves to propagate from said shell casing in response to physical contact with said shell casing.

15. The fishing lure as in claim 14, wherein said shell casing is made of a rigid metal or plastics material.

16. The fishing lure as in claim 15, wherein said shell casing is made of brass.

17. The fishing lure as in claim 14, further comprising an end plug to retain said rattle beads within said shell casing.

18. The fishing lure as in claim 14, wherein said one or more rattle bead are formed of a metal or plastics material.

19. The fishing lure as in claim 14, wherein said fishhook includes a shank portion which is connected rigidly to said shell casing.

20. The fishing lure as in claim 19, wherein said shell casing includes a primer pocket, and wherein said fishhook shank portion is partially inserted into said primer pocket.

21. The fishing lure as in claim 14, which further comprises a spoon body attached to said shell casing.

22. The fishing lure as in claim 14, which further comprises a generally conically shaped cap extending forwardly of said shell casing.

23. The fishing lure as in claim 22, wherein said generally conically shaped cap includes an eyelet at an apex end thereof for connection to a fishing line.

24. The fishing lure as in claim 14, which further comprises an eyelet for connection to a fishing line.

* * * * *